Oct. 14, 1958 R. ADELL 2,856,230
ORNAMENTAL AND PROTECTIVE MOLDING
FOR AUTOMOBILE DOOR EDGES
Filed April 12, 1956

INVENTOR.
Robert Adell
BY Gregory S. Dolgorukov
ATTORNEY.

United States Patent Office 2,856,230
Patented Oct. 14, 1958

2,856,230

ORNAMENTAL AND PROTECTIVE MOLDING FOR AUTOMOBILE DOOR EDGES

Robert Adell, Detroit, Mich., assignor to Franklin Z. Adell and Marvin M. Adell, Detroit, Mich.

Application April 12, 1956, Serial No. 577,698

1 Claim. (Cl. 296—44)

This invention relates to motor vehicles and more particularly to improve bodies thereof in which edges of various movable closures, such as doors, are provided with ornamental and protective moldings.

The present application relates to subject matter similar to that of my co-pending application for Trim Molding, Serial No. 280,297, filed April 3, 1952, now abandoned.

Advantages of providing ornamental and edge protective moldings, such as disclosed by my said co-pending application as well as by my other pending applications and my issued patents, have now been fully appreciated by those skilled in the art. However, it has been found that provision of such moldings presents a number of very difficult problems for some of which no adequate solution has been found, in spite of numerous attempts and a great variety of expedients proposed.

One of the difficult problems confronted in this particular art is provision of practical means for retaining the molding on its edge under various operation conditions, such as in hard slamming of the doors, as well as in closing doors having insufficient clearance between the door edge and the door post.

One of the objects of the present invention is to provide improved edge protective molding for automobile closures, said molding including improved means for retaining the molding in place.

Another object of the present invention is to provide molding specified in the preceding paragraph which can be applied in an easy and simple manner and without any tools and yet will remain in place on the vehicle under all operation conditions.

A further object of the present invention is to provide an improved ornamental and protective molding for the trailing edge of an automobile door, with said molding including improved means adapted to retain the molding in place in a more positive and reliable manner.

A still further object of the present invention is to provide an improved edge protective molding for automobile doors, which is simple and rugged in construction, dependable in use and relatively inexpensive to manufacture.

Further objects and advantages of this invention will be apparent from the following description and appended claim, reference being had to the accompanying drawings forming a part of this specification, wherein like reference characters designate corresponding parts in the several views.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology and terminology employed herein is for the purpose of description and not of limitation.

In accordance with the invention, I install the edge molding over a plurality of retaining clips which are slipped over the edge of the door or other closure, to which the edge molding is to be applied. Under usual conditions, such retaining clips are slipped over the edge approximately 4–6 inches from each other. Generally, molding strips having little longitudinal curvature require smaller number of retaining clips than moldings having a greater curvature or greater variations thereof. The retaining clips include two sets of teeth which do not offer any appreciable resistance to installing the clips or of the molding strip over the clips. However, said teeth tend to dig into the material of the door edge and of the molding strip, respectively, when the molding strip begins to move off the closure edge.

Referring specifically to the drawings, there is shown therein an automobile having closures with edges including curvilinear curvature and provided with edge protective and ornamental moldings embodying the present invention.

Figure 1:
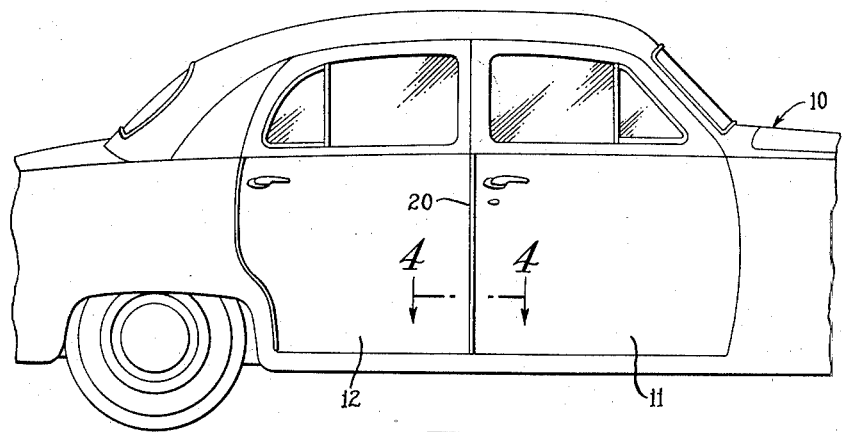
Fig. 1 is a side view of an automobile having doors provided with improved ornamental and protective edge molding embodying the present invention.

The automobile is generally designated with numeral 10 and is shown in Fig. 1 in side elevation to show advantageously the front and the rear doors thereof, said doors being designated generally by the numerals 11 and 12, respectively. While the present invention is herein disclosed with reference to doors, it will be understood that it is applicable to other closures of automobiles, such as trunk lids, engine hoods and the like. It will also be understood that while the present invention is herein illustrated and described with reference to an ornamental and protective molding applied to only the lower portion of the trailing edge of the door, it is not limited to application to only such portion.

The molding comprises generally a strip 20 of sheet metal, such as stainless sheet steel, having a substantially U-shaped or oval cross section open at one end and closed at the other. The edges of the strip 20 along the U may be bent upon themselves as shown at 21 and 22, it being preferable to have the edge intended to be on the outside of the vehicle to be curled but not compressed. The strip 20 is bent to longitudinal curvature corresponding to that of the door edge to which it is to be applied, as best seen in Fig. 3.

Figure 5:
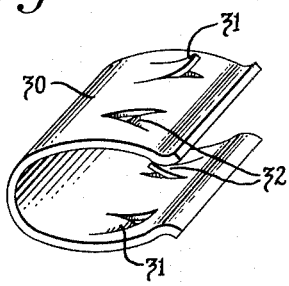
Fig. 5 is a perspective view showing, on an enlarged scale, one of the molding strip retaining clips.

The retaining clips 30 comprise short pieces approximately ¾" in length and bent also to a U-shaped or oval cross section adapted to fit generally within the cross section of the molding strip 20. Clips 30 are preferably made of spring steel by stamping, with the material of the clip being partially punched out to form two sets of teeth. Teeth 31 are provided on the opposite legs of the U and are punched to have their sharp edges directed away from the closed end of the U and extend outwardly of the U. On the other hand, the teeth 32, while being provided also on the opposite legs of the U, are directed toward the closed end of the U and project inwardly of the U as is best shown in Fig. 5.

It is preferable to have the clips hardened in order to ensure that the retaining teeth 31 and 32 possess sufficient resiliency without distortion and acquire hardness greater than that of the materials of the molding strip and of the door edge.

Figure 2:
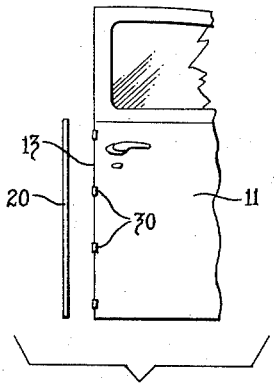
Fig. 2 is an exploded side view showing the molding about to be applied to the door edge.
Figure 3:
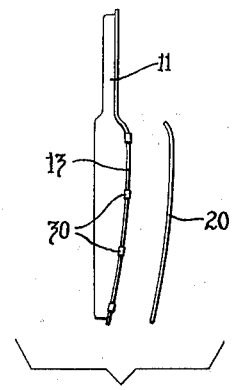
Fig. 3 is an end view of the construction of Fig. 2, with the molding strip being offset to the right for the sake of clarity.
Figure 4:
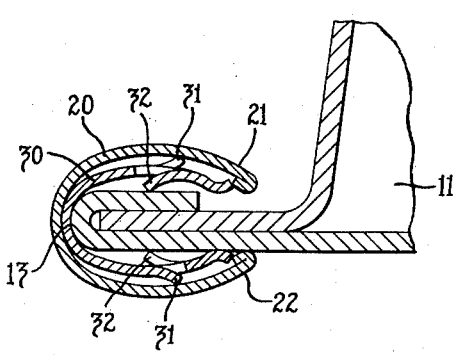
Fig. 4 is a section taken in the direction of the arrows on the section plane passing through the line 4—4 of Fig. 1.

It will now be seen in view of the foregoing that for applying the molding strip to the door edge, a number of retaining clips 30 may be first slipped on the edge to which the molding strip 20 is to be applied as is shown in Figs. 2 and 3. It will be understood that in such application of the clips, the teeth 32 do not offer appreciable resistance, although being in contact with the door edge they may scribe a line on the door edge as they are being slipped on. Similarly, when molding strip 20 is being applied to the edge 13 by being slipped over clips 30, the retaining teeth 31 bend slightly and may also scribe a line on the inner surface of the molding strip, but beyond that they do not offer any appreciable resistance to the movement of the molding strip 20 over the clips on the way in.

However, after such installation is effected, the molding becomes positively connected to the door edge through the clips 30. Should an effort be exerted on the molding to pull it off the door edge 13, the retaining teeth 31 will dig into the material of the molding and, being aided by the mechanical advantage caused by the curvature of the molding, will dig into the material of the strip 20. Thus, the effort applied to the strip 20 will be transmitted to the body of the clip 30. However, in so doing, the retaining teeth 32 will be caused to dig into the material of the door edge 13, and thus the effort to remove the molding will be transferred to and resisted by the teeth 32 digging directly into the material of the door edge. By virtue of such a construction, retention of the molding strip 20 in place is made more positive and reliable.

By virtue of the construction disclosed above, objects of the present invention and numerous additional advantages are attained.

I claim:

An ornamental and edge protective molding for the trailing edge of an automobile door, said molding comprising a strip of a substantially U-shaped cross section with the edges thereof being bent inwardly of the U, a plurality of sheet metal retaining clips adapted to be slipped over the door edge to which the molding is to be applied, each of said clips being of a substantially U-shaped cross section with the edges thereof being bent outwardly of the U and having the metal of its legs partially punched out and pushed outwardly to form two sets of retaining teeth having pointed ends and extending at a sharp angle to the surfaces from which they are formed, the teeth of one of said sets being provided on opposite legs of the U and at opposite ends of the clip and directed inwardly of the U toward the closed end thereof, while the teeth of the other set are provided also on the opposite legs of the U and at opposite ends of the clip but directed outwardly of the U and away from the closed end thereof, said teeth being adapted to dig into the material of the door edge and of the molding strip, respectively, but only at the surfaces thereof to retain the same in place after said molding strip is slipped on the door edge over said clips, with the outwardly bent edges of the clip engaging inwardly bent edges of the molding.

References Cited in the file of this patent

UNITED STATES PATENTS

| | | |
|---|---|---|
| 2,216,219 | Wiley | Oct. 1, 1940 |
| 2,685,473 | Adell | Aug. 3, 1954 |
| 2,733,097 | Stevens | Jan. 31, 1956 |

FOREIGN PATENTS

| | | |
|---|---|---|
| 684,098 | Great Britain | Dec. 10, 1952 |